United States Patent
Huang

(10) Patent No.: US 10,338,836 B2
(45) Date of Patent: Jul. 2, 2019

(54) PAGE ALIGNING METHOD AND LOOKUP TABLE GENERATING METHOD OF DATA STORAGE DEVICE

(71) Applicant: Silicon Motion, Inc., Jhubei, Hsinchu (TW)

(72) Inventor: Sheng-Yuan Huang, New Taipei (TW)

(73) Assignee: Silicon Motion, Inc., Hsinchu (TW)

( * ) Notice: Subject to any disclaimer, the term of this patent is extended or adjusted under 35 U.S.C. 154(b) by 98 days.

(21) Appl. No.: 15/495,994

(22) Filed: Apr. 25, 2017

(65) Prior Publication Data

US 2017/0337006 A1 Nov. 23, 2017

(30) Foreign Application Priority Data

May 20, 2016 (TW) .............................. 105115877 A

(51) Int. Cl.
*G06F 3/06* (2006.01)
*G06F 12/02* (2006.01)

(52) U.S. Cl.
CPC ............ *G06F 3/0631* (2013.01); *G06F 3/061* (2013.01); *G06F 3/064* (2013.01); *G06F 3/0608* (2013.01); *G06F 3/0632* (2013.01); *G06F 3/0653* (2013.01); *G06F 3/0679* (2013.01); *G06F 12/0246* (2013.01)

(58) Field of Classification Search
CPC .. G06F 12/0246; G06F 3/0631; G06F 3/0608; G06F 3/064; G06F 3/0679; G06F 3/061; G06F 3/0653; G06F 3/0632
See application file for complete search history.

(56) References Cited

U.S. PATENT DOCUMENTS

| 2009/0164745 | A1* | 6/2009 | Sinclair | ............... G06F 12/0246 711/170 |
| 2015/0347015 | A1 | 12/2015 | Pawlowski | |

FOREIGN PATENT DOCUMENTS

| CN | 103823762 | 5/2014 |
| CN | 105069048 | 11/2015 |
| TW | 201109921 | 3/2011 |
| TW | I375190 | 10/2012 |
| TW | 201527977 | 7/2015 |

* cited by examiner

Primary Examiner — Hiep T Nguyen

(57) ABSTRACT

A page aligning method for a data storage device is provided. The data storage device includes a non-volatile memory and the page aligning method includes steps of: executing a system initialization on the non-volatile memory to obtain a remaining storage capacity; selecting a number from a lookup table as an initial storage capacity according to the remaining storage capacity and a lookup table; and referring the initial storage capacity as a fixed capacity in the data storage device and writing the initial storage capacity into the non-volatile memory. A lookup table generating method and the data storage device are also provided.

20 Claims, 3 Drawing Sheets

· · · | 31.55GB | 31.7GB | 32.1GB | · · ·

PAGE ALIGNING METHOD AND LOOKUP TABLE GENERATING METHOD OF DATA STORAGE DEVICE

FIELD OF THE INVENTION

The present invention relates to a page aligning method of a data storage device, and more particularly to a page aligning method and a lookup table generating method of a data storage device capable of reducing hidden spaces.

BACKGROUND OF THE INVENTION

A data storage device, such as disk or portable disk, includes a non-volatile memory for storing data. The non-volatile memory includes a plurality of pages. In order to improve the reading speed of the data storage device, page alignment is executed on the storage space in the data storage device so as to make each record of data with a size identical to the storage capacity of a page to be written into a completely empty page. Namely, each record of data is written into one page, thereby avoiding the record of data being written across more than one page. However, in conventional page alignment, some pages are configured for not storing data and the remaining storage capacity are designed as empty pages for storing data. However, these pages configured for not storing data may be determined as unallocated space by the operating system and the pages are configured for not storing data may occupy too much storage space; therefore, the user may loss some storage space. In addition, when the data storage device is re-formatted and the file system parameters change accordingly, the effect of page alignment may be moot thus leading to a poor system performance.

SUMMARY OF THE INVENTION

Therefore, in order to achieve the purpose of page alignment without occupying too much storage space, the present invention provides a page aligning method for a data storage device. The data storage device includes a non-volatile memory and the page aligning method includes steps of: executing a system initialization on the non-volatile memory to obtain a remaining storage capacity; selecting a number from a lookup table as an initial storage capacity according to the remaining storage capacity and a lookup table; and referring the initial storage capacity as a fixed capacity in the data storage device and writing the initial storage capacity into the non-volatile memory.

The present invention further provides a lookup table generating method alignment of pages in a data storage device. The data storage device includes a non-volatile memory and the lookup table generating method includes steps of: setting a simulative initial storage capacity; setting a hidden space; simulating a formatting process on the simulative initial storage capacity without altering the hidden space to generate a valid storage capacity; and storing a current simulative initial storage capacity into a lookup table when the current valid storage capacity satisfies a predetermined condition and the hidden space is smaller than a default value.

The present invention still provides a data storage device. The data storage device includes a non-volatile memory and a memory controller. The non-volatile memory is for storing data, and includes a plurality of data blocks; and each of the data blocks includes a plurality of data pages. The memory controller is for controlling operations of the non-volatile memory and determining a valid storage capacity of the data storage device according to a fixed capacity stored in an information block.

The present invention still further provides a data storage device. The data storage device includes a plurality of data blocks and a memory controller. Each of the data blocks includes a plurality of data pages for storing data. The memory controller is for logically defining the data blocks into an information block and a plurality of remaining blocks and determining a valid storage capacity of the remaining storage capacity of the remaining blocks according to a fixed capacity.

In summary, because the present invention simulates various storage capacities in advance and selects one of the simulated storage capacities as the initial storage capacity which has passed a page alignment check, a data storage device adopting the initial storage capacity is page aligned accordingly. In addition, because the hidden space corresponding to the selected initial storage capacity is smaller than a default value, the data storage device is page aligned and the hidden space is not determined as an unallocated space by an operating system and less storage capacity is reserved/occupied.

BRIEF DESCRIPTION OF THE DRAWINGS

Other advantages, objectives and features of the present invention will become apparent from the following description referring to the attached drawings.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
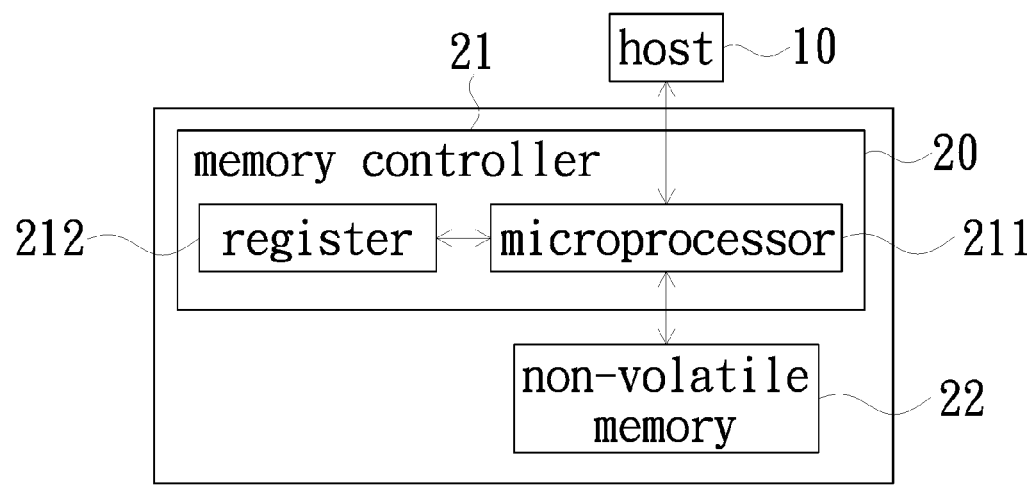
FIG. 1 is a schematic block view of a system in accordance with an embodiment of the present invention.

FIG. 1 is a schematic block view of a system in accordance with an embodiment of the present invention. As shown in FIG. 1, the system of the present embodiment includes a host 10 and a data storage device 20. The host 10 may be an electronic device such as a desktop computer or a tablet computer. The host 10 is electrically coupled to the data storage device 20. The data storage device 20 is configured to receive a write command or a read command issued from the host 10, write received data into the data storage device 20 according to the write command, or read data stored in the data storage device 20 according to the read command. The data storage device 20 includes a memory controller 21 and a non-volatile memory 22. The memory controller 21 includes a microprocessor 211 and a register 212. The microprocessor 211 is electrically coupled to the register 212. The non-volatile memory 22 may be a data storage medium such as a flash memory, MRAM (Magnetic RAM), FRAM (Ferroelectric RAM), PCM (Phase Change Memory), STTRAM (Spin-Transfer Torque RAM), ReRAM (Resistive RAM), Memristor or other memory-like device suitable for long-term data storage. The non-volatile memory 22 includes a plurality of blocks for storing data. Each of the blocks includes a plurality of pages. Each of the pages includes a plurality of areas. Before storing any data, the non-volatile memory 22 has an original storage capacity. The microprocessor 211 is electrically coupled to the non-volatile memory 22 and configured to write data into or read data from the non-volatile memory 22 according to the write command or the read command.

Figure 2:
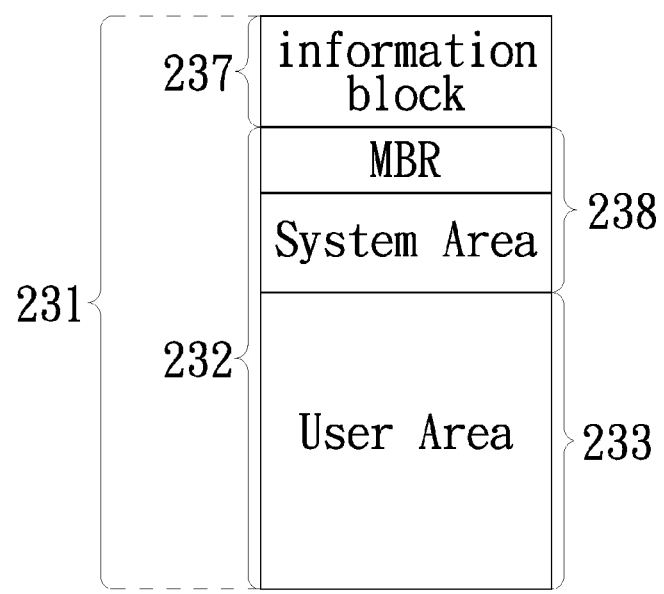
FIG. 2 is a schematic illustration of a distribution of a storage capacity.

Manufacturer performs an initiation process on the data storage device 20 via the host 10 when the data storage device 20 is in the manufacturing stage. The initiation process mainly includes a system initialization and a low-level format. The system initialization is for generating an information block (or blocks). FIG. 2 is a schematic illustration of a distribution of a storage capacity of the non-volatile memory 22. As shown in FIG. 2, the storage capacity of information block 237 occupies a portion of the storage capacity of the non-volatile memory 22. The information block mainly includes in-system programming firmware and product information. The product information includes the basic information about the data storage device 20, such as: the manufacturer number, the product model, the storage capacity of the pages in the non-volatile memory 22 (e.g., 16 kilobytes (KB)), the size of data protection area and the bad block record table. The storage capacity of the bad blocks which is prohibited to be accessed by the user is included into the storage capacity of information block 237. When the system initialization is completed, the information block is written into the non-volatile memory 22 and an initial storage capacity 232 of the data storage device 20 is determined. As shown in FIG. 2, the initial storage capacity 232 of the non-volatile memory 22 is referred to as the capacity deducting the storage capacity of information block 237 from the original storage capacity 231.

When the low-level format is executed, the memory controller 21 generates format data according to a specific file system. The specific file system may be FAT (File Allocation Table), EXFAT (Extended File Allocation Table) or NTFS (New Technology File System) which are commonly used in Windows operating system or EXT (Extended File System) which is commonly used in Linux operating system. Taking the SD (Secure Digital) disk as an example, the file system specification drafted by the SD disk association (version 3.0 and the release date: Apr. 16, 2009) provides various suggestions for file systems according to the data storage devices with different available storage capacities. For example, FAT32 is suggested as the file system if the valid storage capacity is ranged from 2 gigabytes (GB) to 32 GB. Different operating systems define different sizes of clusters for the data storage devices 20 with different original storage capacities; wherein each cluster includes a plurality of sectors with a size of 512 bytes (B) for example. Taking Windows 7.0 and FAT32 as an example, the default cluster has a size of 4 KB if the valid storage capacity is ranged from 256 megabytes (MB) to 8 GB.

To simplify the description of the present invention, FAT32 is taken as an example for the description of the present invention, but the present invention is not limited thereto. As shown in FIG. 2, the storage capacity of deducting a storage capacity of format data 238 from the initial storage capacity 232 is referred to as a valid storage capacity 233. The format data mainly includes the MBR (Master Boot Record) and the System Area. The valid storage capacity 233 may correspond to the user area, which is defined in FAT32 and for storing data. It is noted that the content of the MBR is unaltered in the high-level format unless the low-level format is executed again.

For the convenience in use, the manufacturer may execute the high-level format on the data storage device 20 after the initiation process directly. To achieve page alignment, the manufacturer may reserve a specific capacity in the storage capacity of format data 238, and the specific capacity may be determined as an unallocated space by the operating system. Otherwise, the effect of page alignment may be moot when the user re-executes the high-level format and thus leading to a poor system performance of the data storage device 20 if without the reserved specific capacity.

Figures 3, 4:
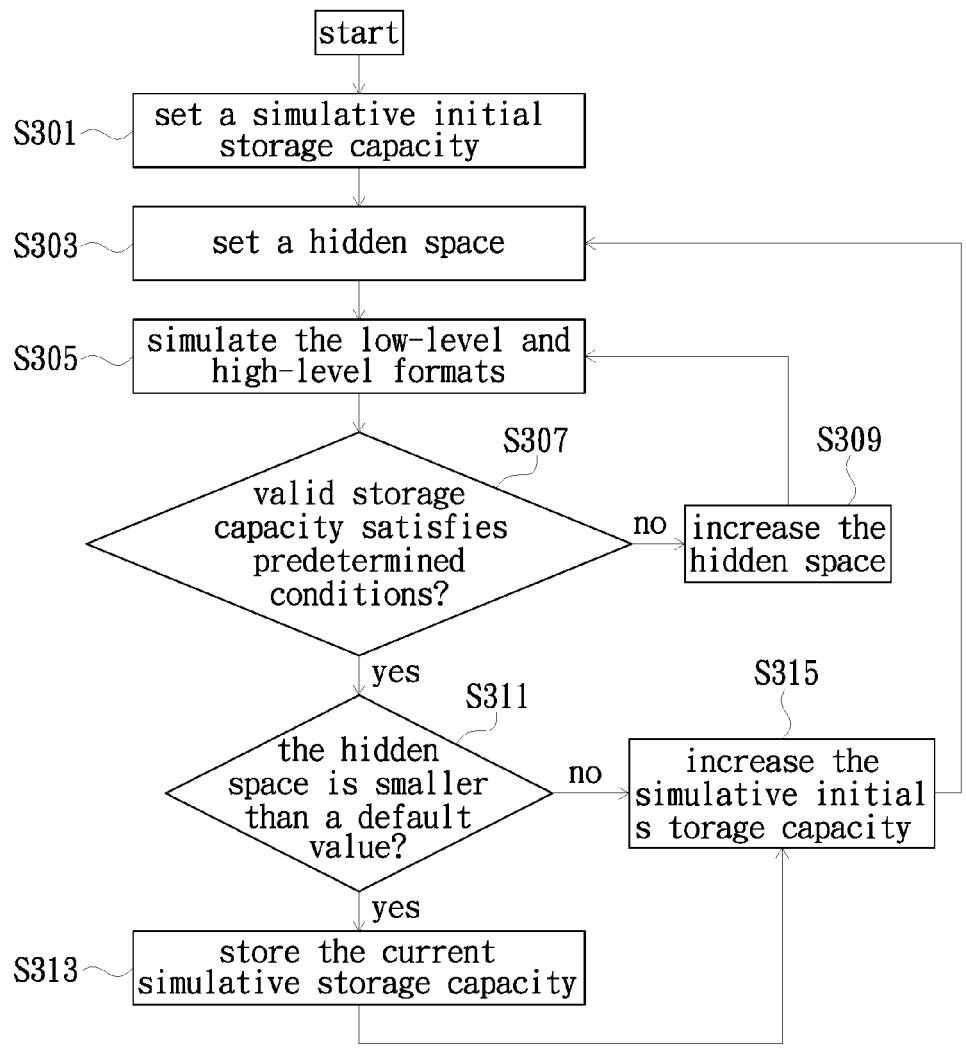
FIG. 3 is a flow chart of a lookup table generating method in accordance with an embodiment of the present invention.
FIG. 4 is a schematic view of a portion of a lookup table of the present invention.

To overcome the aforementioned problem, the present invention provides a page aligning method for a data storage device and a cooperative lookup table generating method. FIG. 3 is a flow chart of a lookup table generating method in accordance with an embodiment of the present invention. First, executing step S301: setting a simulative initial storage capacity. The simulative initial storage capacity is for simulating the initial storage capacity and its size is not limited to the below exemplary numbers. For example, the simulative initial storage capacity may be set to 32 MB in one embodiment, but the present invention is not limited thereto. Thereafter, executing step S303: setting a hidden space. The size of the hidden space is not limited to the below exemplary number. For example, the hidden space may be set to 0 in one embodiment, but the present invention is not limited thereto. The hidden space may be located between the system area and the user area defined in FAT32; or, the hidden space may be located in the system area and adjacent to the MBR technically, wherein the hidden space is not supposed to store any data.

Thereafter, executing step S305: simulating the low-level and high-level formats without altering the hidden space and thereby generating the valid storage capacity in FIG. 2. Specifically, the host 10 simulates the low-level format on the data storage device 20 and assumes that there is only one partition initially; wherein the result of the aforementioned simulation generates the format data. The MBR in the format data includes, for example, four partition tables and each of which records the start address and the capacity of the respective partition in the valid storage capacity; and therefore, the host 10 knows the start address and the capacity of each partition. Because there is one partition (e.g., the first partition) only, pages in the user area are aligned if the start address of the first partition has page alignment. It is noted that the capacity of the partition is the valid storage capacity 233. The start address of the first partition table may vary with the size of the hidden space. For example, the start address of the first partition table is, for example, the $1000^{th}$ sector if the size of the hidden space is 0; and, the start address of the first partition table is, for example, the $1032^{th}$ sector if the size of the hidden space increases to 32 sectors.

Thereafter, executing step S307: determining whether the valid storage capacity are page aligned, that is, determining whether the storage capacity of the user area is N times of the capacity of one page. If the determination result obtained in step S307 is no, then executing step S309: increasing the hidden space. In one embodiment, the hidden space is increased to 32 sectors, but the present invention is not limited thereto. Then, steps S305 and S307 are re-executed sequentially.

Alternatively, if the determination result obtained in step S307 is yes, then executing step S311: determining whether the current hidden space is smaller than a default value. In one embodiment, the aforementioned default value is 15 MB, but the present invention is not limited thereto. In one preferred embodiment, the aforementioned default value is equal to a value that the operating system determines the existence of the unallocated space. If the determination result obtained in step S311 is yes which indicates that the current valid storage capacity 233 is page aligned and the corresponding hidden space is not determined as the unallocated space by the operating system, then executing step S313: storing the current simulative initial storage capacity into a lookup table. Thereafter, executing step S315: increasing the simulative initial storage capacity. In one embodiment, the simulative initial storage capacity is increased to 128 sectors, but the present invention is not limited thereto. Then steps S303 is re-executed.

In general, a lookup table has huge content; therefore, to simply the description of the present invention, only three simulative initial storage capacities 31.55 GB, 31.7 GB and 32.1 GB are exemplarily listed in the lookup table of FIG. 4. If the determination result obtained in step S311 is no which indicates that the current simulative initial storage capacity cannot meet the requirement of the present invention, then steps S315 and S303 are executed sequentially. Once all of the possible initial storage capacities such as 32 MB-2 terabytes (TB) are simulated, the lookup table generating method of the present invention ends.

Figure 5:
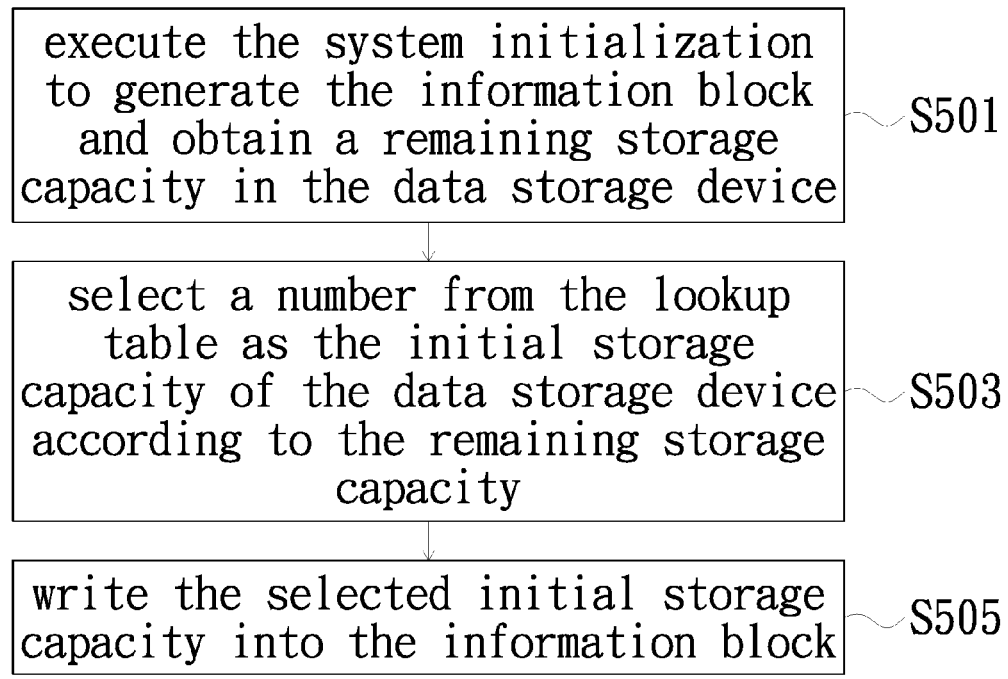
FIG. 5 is a flow chart of a page aligning method for a data storage device in accordance with an embodiment of the present invention.
Figure 6:
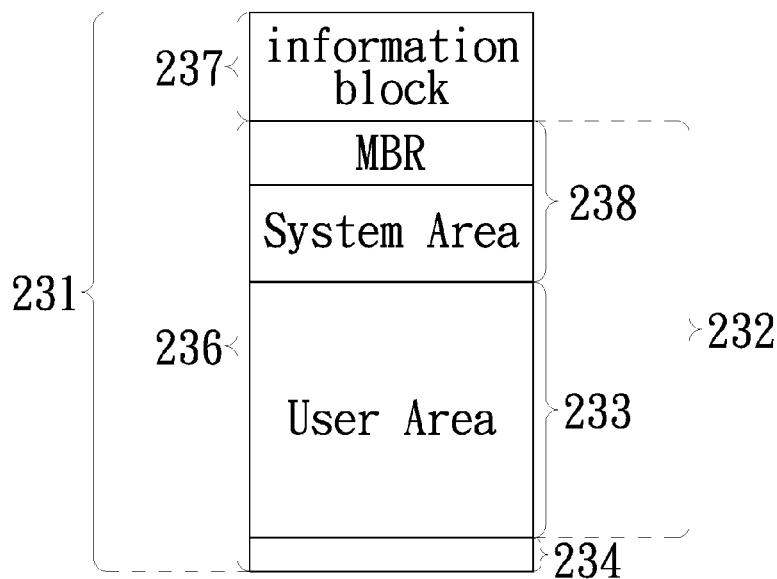
FIG. 6 is a schematic illustration of another distribution of a storage capacity.

To achieve the purpose of the present invention, the page aligning method for a data storage device of the present invention is implemented based on the initial storage capacity of the data storage device 20 set according to the lookup table of the present invention. FIG. 5 is a flow chart of a page aligning method for a data storage device in accordance with an embodiment of the present invention and FIG. 6 is another schematic illustration of a distribution of a storage capacity of the non-volatile memory 22. Please refer to FIGS. 5 and 6 together. First, executing step S501: executing the system initialization to generate the information block and obtain a remaining storage capacity 236 in the data storage device 20. Because the information block is written into the non-volatile memory 22 in the system initialization, the data storage capacity of the data storage device 20 (or the non-volatile memory 22) is changed to the remaining storage capacity 236 by the original storage capacity 231; wherein the remaining storage capacity 236 is referred to as the capacity deducting the storage capacity of information block 237 from the original storage capacity 231.

Thereafter, executing step S503: selecting a number from a lookup table of the present invention as the initial storage capacity 232 of the data storage device 20 according to the remaining storage capacity 236; wherein the initial storage capacity 232 is smaller than the remaining storage capacity 236. The initial storage capacity 232 is selected from the simulative initial storage capacities in the lookup table of the present invention. In one preferred embodiment, the initial storage capacity 232 is smaller than and most closes to the remaining storage capacity 236. For example, if the remaining storage capacity 236 is 32 GB, the host 10 selects 31.7 GB (which is smaller than and most closes to 32 GB) from the lookup table of FIG. 4 as the initial storage capacity 232 of the data storage device 20. The difference 234 between the initial storage capacity 232 (e.g., 31.7 GB) and the remaining storage capacity 236 (e.g., 32 GB) is 0.3 GB, which can be referred to as or added into the capacity of the spare blocks. The aforementioned spare blocks are for replacement. Specifically, when a block stored with data needs a refresh, the stored data needs to move to an empty spare block first and then the block originally stored with the data is erased and be a spare block. In order to provide sufficient numbers of spare blocks, in another embodiment the initial storage capacity 232 is smaller than the remaining storage capacity 236 and the difference between the two is greater than a threshold (e.g., 0.4 GB) or 1% of the remaining storage capacity 236 (e.g., 0.32 GB). Therefore, the host 10 selects 31.55 GB from the lookup table of FIG. 4 as the initial storage capacity 232 of the data storage device 20 due to the difference 234 between the two is 0.45 GB which satisfies the threshold.

Thereafter, executing step S505: writing the selected initial storage capacity 232 into the information block. Thereafter, the page aligning method for a data storage device of the present invention ends. Because the data storage device 20 provides the function of fixed capacity, the data storage device 20 always replies the same initial storage capacity 232 which has passed the simulations of the low-level and high-level formats when the host 10 asks for the initial storage capacity 232 of the data storage device 20. Therefore, when the host 10 executes the real low-level and high-level formats on the data storage device 20, the data storage device 20 performs the steps S307 and S309 to insert the hidden space thereby achieving the effect of page alignment. As a result, the purpose of the present invention is achieved without having to record the hidden space in the lookup table of the present invention, sacrificing page alignment in the data storage device 20 and having unallocated space.

In summary, because the lookup table generating method of the present invention simulates the formatting steps performed while manufacturing the data storage device 20, the storage capacity can be aligned is simulated accurately and the corresponding hidden space would not determined as unallocated space by the operating system. In addition, because the storage capacity occupied by format data generated by every formatting is identical, the storage capacity in the user area is still page aligned even the user executes formatting after the data storage device 20 is manufactured. Namely, pages in the data storage device 20 would remain aligned after the format is re-executed.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A page aligning method for a data storage device, wherein the data storage device comprises a non-volatile memory, and the page aligning method comprises steps of:

executing a system initialization on the non-volatile memory to obtain a remaining storage capacity of the data storage device;

selecting a number from a lookup table as an initial storage capacity according to the remaining storage capacity;

referring the initial storage capacity as a fixed capacity of the data storage device and writing the initial storage capacity into the non-volatile memory; and replying, by the data storage device, the same initial storage capacity to a host when the host requests an initial storage capacity of the data storage device.

2. The page aligning method according to claim 1, wherein an information block is generated when the system initialization is executed on the non-volatile memory.

3. The page aligning method according to claim 1, wherein the initial storage capacity is smaller than the remaining storage capacity.

4. The page aligning method according to claim 1, wherein the initial storage capacity is smaller than an unallocated space determined by an operating system.

5. The page aligning method according to claim 1, wherein the number is a simulative initial storage capacity.

6. The page aligning method according to claim 1, wherein the initial storage capacity is written into an information block in the non-volatile memory.

7. The page aligning method according to claim 1, wherein the initial storage capacity was set during a lookup table generating method.

8. A lookup table generating method for alignment of pages in a data storage device, wherein the data storage device comprises a non-volatile memory and the lookup table generating method comprises steps of:
   setting a simulative initial storage capacity;
   setting a hidden space;
   simulating a formatting process on the simulative initial storage capacity without altering the hidden space to generate a valid storage capacity; and
   storing a current simulative initial storage capacity into a lookup table when the current valid storage capacity satisfies a predetermined condition and the hidden space is smaller than a default value.

9. The lookup table generating method according to claim 8, wherein the steps of storing the current simulative initial storage capacity into the lookup table when the current valid storage capacity satisfies the predetermined condition and the hidden space is smaller than the default value comprises steps of:
   determining whether the valid storage capacity satisfies the predetermined condition;
   if yes, determining whether the hidden space is smaller than the default value; and
   if no, storing the current simulative initial storage capacity into the lookup table.

10. The lookup table generating method according to claim 9, wherein the step of determining whether the valid storage capacity satisfies the predetermined condition comprises steps of:
    determining whether the valid storage capacity satisfies the predetermined condition; and
    if no, increasing the hidden space.

11. The lookup table generating method according to claim 9, wherein the step of determining whether the hidden space is smaller than the default value comprises steps of:
    determining whether the hidden space is smaller than the default value; and
    if no, increasing the simulative initial storage capacity.

12. The lookup table generating method according to claim 8, wherein the predetermined condition is that the valid storage capacity is N times of a capacity of a page in the non-volatile memory, wherein N is a positive integer.

13. The lookup table generating method according to claim 8, wherein the hidden space is located between a system area and a user area.

14. The lookup table generating method according to claim 8, wherein the hidden space is located adjacent to a master boot record (MBR).

15. A data storage device, comprising:
    a non-volatile memory for storing data, wherein the non-volatile memory comprises a plurality of data blocks and each of the data blocks comprises a plurality of data pages; and
    a memory controller for controlling operations of the non-volatile memory and determining a valid storage capacity of the data storage device according to a fixed capacity stored in an information block.

16. The data storage device according to claim 15, wherein the valid storage capacity is smaller than or equal to a remaining storage capacity.

17. The data storage device according to claim 15, wherein the fixed capacity is determined based on a lookup table and a remaining storage capacity.

18. A data storage device, comprising:
    a plurality of data blocks, wherein each of the data blocks comprises a plurality of data pages for storing data; and
    a memory controller, logically defining the data blocks into an information block and a plurality of remaining blocks and determining a valid storage capacity of the remaining storage capacity of the remaining blocks according to a fixed capacity.

19. The data storage device according to claim 18, wherein the fixed capacity is determined based on a lookup table and the remaining storage capacity.

20. The data storage device according to claim 18, wherein the information block also stores an in-system programming firmware and product information.

* * * * *